(12) United States Patent
Grigorovich

(10) Patent No.: US 8,567,109 B1
(45) Date of Patent: Oct. 29, 2013

(54) LUMINESCENT FISHING LURE WITH TRANSPARENT LIP

(76) Inventor: Michael G. Grigorovich, Monroeville, PA (US)

( * ) Notice: Subject to any disclaimer, the term of this patent is extended or adjusted under 35 U.S.C. 154(b) by 145 days.

(21) Appl. No.: 13/152,046

(22) Filed: Jun. 2, 2011

(51) Int. Cl.
*A01K 85/01* (2006.01)

(52) U.S. Cl.
USPC .......................... 43/17.6; 43/42.22; 43/42.33

(58) Field of Classification Search
USPC ............... 43/17.6, 42.22, 42.32, 42.33, 42.34
See application file for complete search history.

(56) References Cited

U.S. PATENT DOCUMENTS

| | | | |
|---|---|---|---|
| 3,828,177 A * | 8/1974 | Day .............................. | 43/17.6 |
| 4,581,839 A * | 4/1986 | Mattison ....................... | 43/17.6 |
| 4,610,103 A * | 9/1986 | Steinman ...................... | 43/17.6 |
| 4,638,584 A | 1/1987 | Lindsay | |
| 4,693,032 A | 9/1987 | Mattison | |
| 4,709,499 A * | 12/1987 | Ottaviano ..................... | 43/17.6 |
| 5,465,524 A * | 11/1995 | Vallone et al. ............... | 43/42.32 |
| 5,566,494 A | 10/1996 | Zimmer | |
| 5,758,450 A * | 6/1998 | Young ........................... | 43/17.6 |
| 6,108,960 A | 8/2000 | Sylla et al. | |
| D468,390 S | 1/2003 | Stevens | |
| 7,114,280 B2 | 10/2006 | Turner | |
| 8,091,270 B2 * | 1/2012 | Senter et al. .................. | 43/17.6 |
| 2002/0174590 A1 | 11/2002 | Nix et al. | |
| 2004/0244265 A1* | 12/2004 | Miyata et al. ................. | 43/17.6 |
| 2005/0178044 A1* | 8/2005 | Stechschulte ................ | 43/42.32 |

* cited by examiner

*Primary Examiner* — David Parsley

(57) ABSTRACT

The present invention features a luminescent fishing lure for attachment to a fishing line and attracting fish. In some embodiments, the lure comprises a body having a top portion and a bottom portion. In some embodiments, the top portion is opaque and the bottom portion is transparent.

1 Claim, 4 Drawing Sheets

LUMINESCENT FISHING LURE WITH TRANSPARENT LIP

BACKGROUND OF THE INVENTION

The present invention provides a fishing lure that can increase the success in hooking and catching fish. The glow stick is sealed off in the body of the lure such that no scent from the glow stick can leak to the outside and scare fish away. Further the lure has an inventive bottom glow pattern and an inventive transparent lip.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
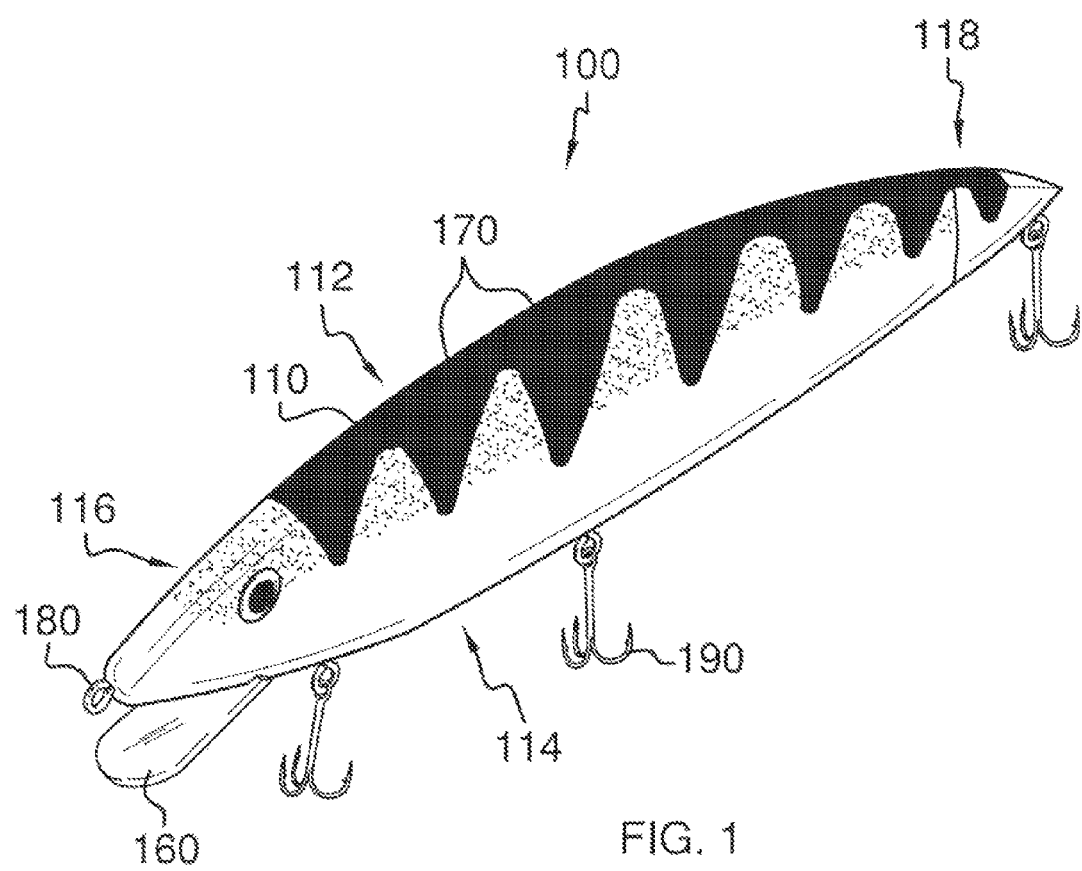
FIG. 1 shows a perspective view of the lure.
Figure 2:
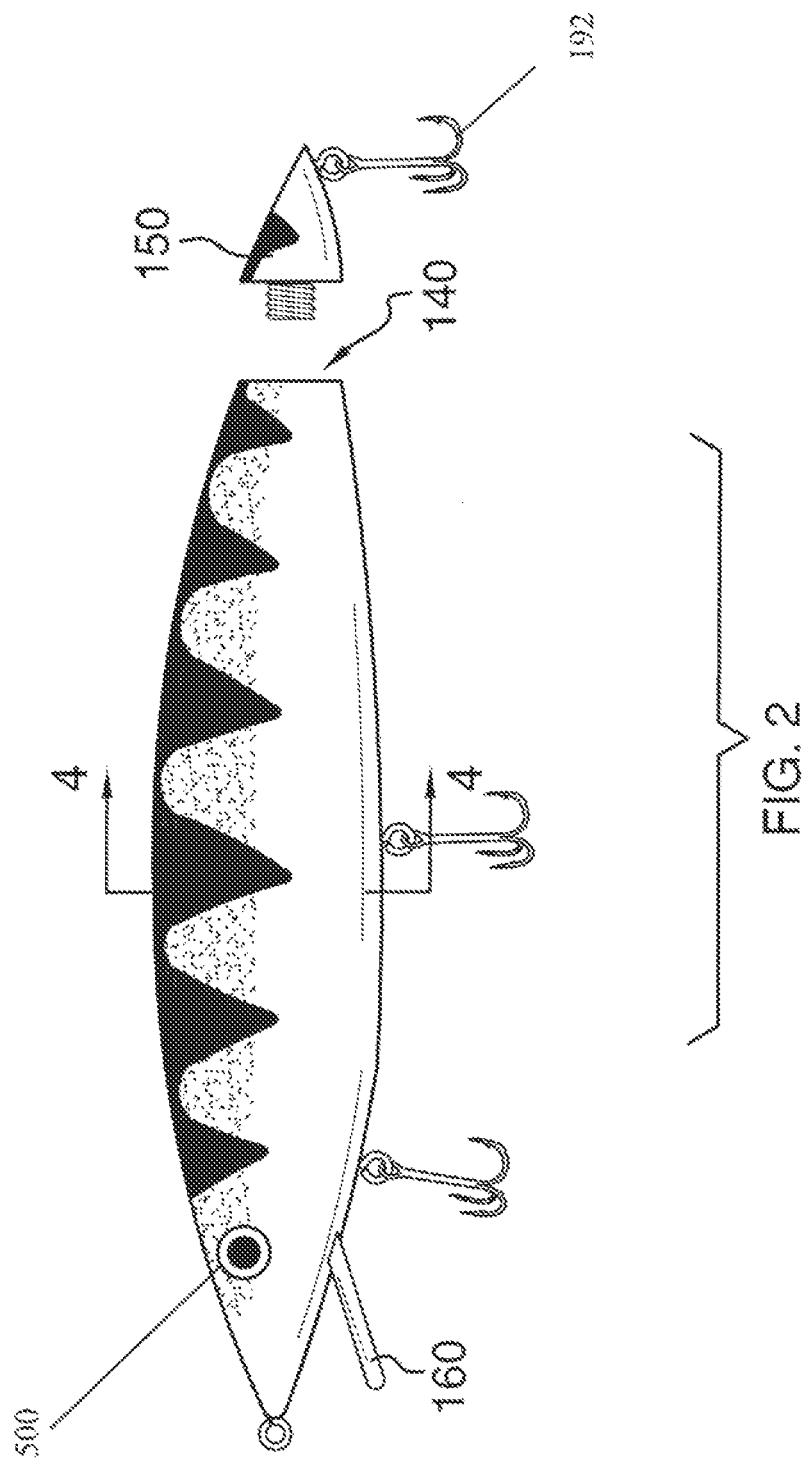
FIG. 2 shows a side view of the lure.
Figure 3:
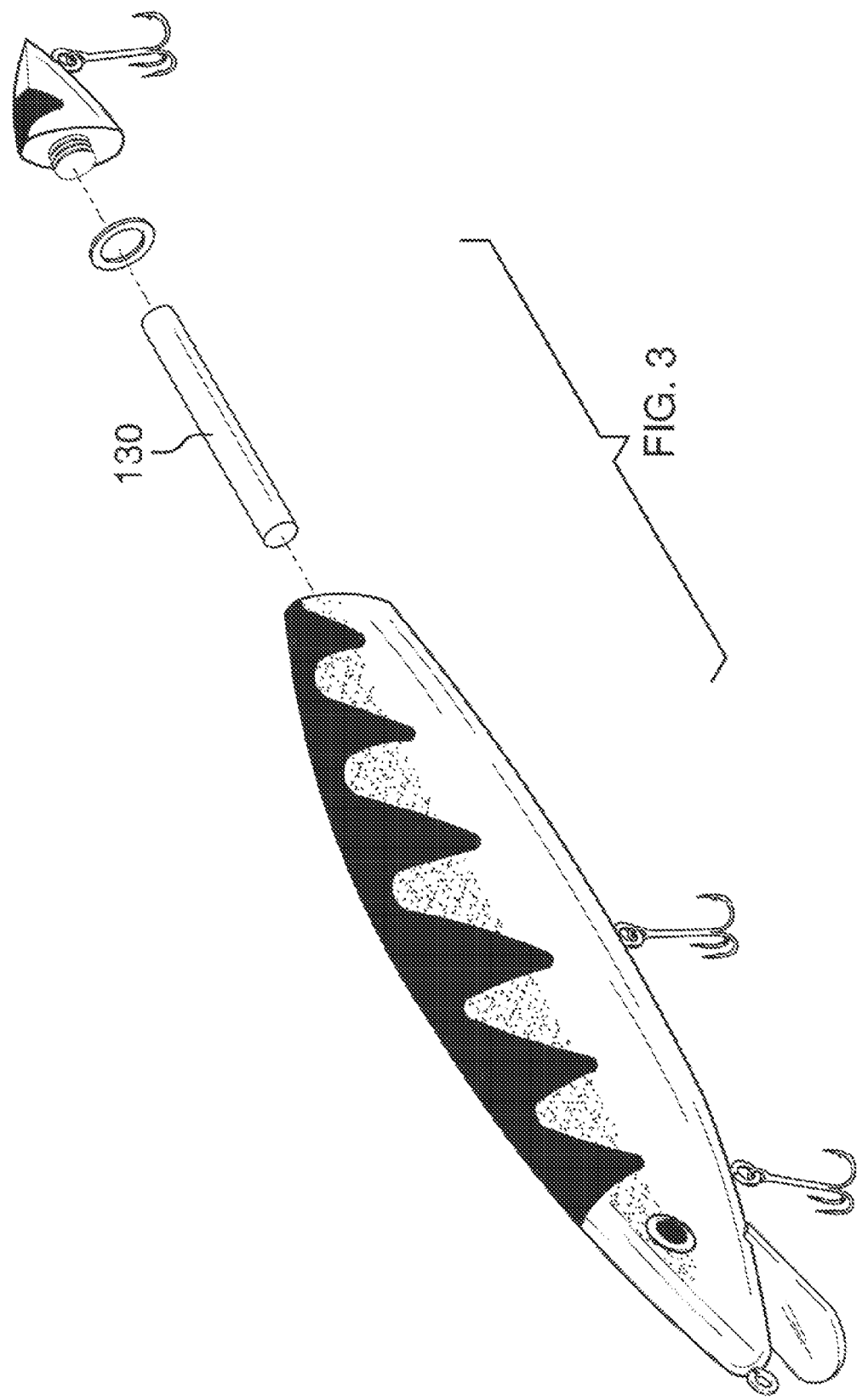
FIG. 3 shows an exploded view of the lure.
Figure 4:
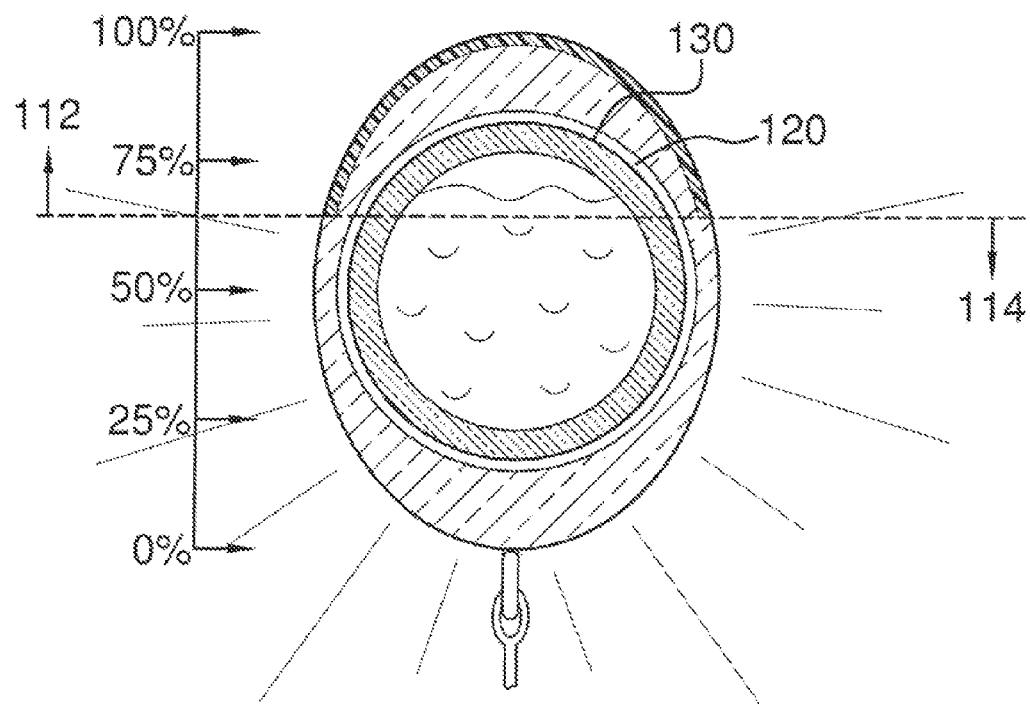
FIG. 4 shows a cross-sectional view of the lure.
Figure 5:
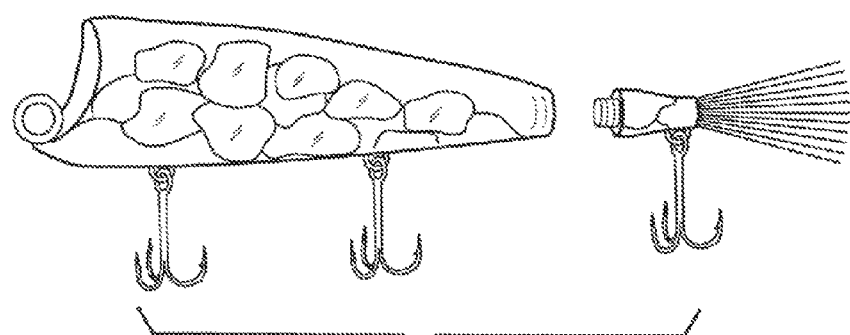
FIG. 5 shows an alternative embodiment of the lure.

Referring now to FIG. 1-5, the present invention features a luminescent fishing lure 100 for attachment to a fishing line and attracting fish. In some embodiments, the lure 100 comprises a body 110 having a top portion 112 and a bottom portion 114. In some embodiments, the top portion 112 is opaque and the bottom portion 114 is transparent. As shown in FIG. 4, the top portion is located above the mid-section of the lure, and the bottom portion is located below the mid-section. The mid-section may be anywhere within the 50% to 75% demarcation as shown in FIG. 4.

In some embodiments, the body further has a head end 116 and a tail end 118. The body further comprises a cavity 120 in the body for insertion of a glow stick 130, wherein the glow stick 130 radiates from the cavity 120 through the bottom portion 114 of the body 110. The body 110 further comprises an opening 140 that opens up the body to the cavity 120. In some embodiments, a cap 150 is used to seal off the opening 140 to the cavity 120 as to prevent any scent from the glow stick 130 from leaking to the outside of the cavity 120. In some embodiments, the cap 150 is disposed on the tail end 118 of the body 110. In some embodiments, the cap 150 is crewed on to the body at the opening 140

In some embodiments, a transparent lip 160 is disposed on the head end 116 of the body 110. The transparent lip 160 may be constructed from a plastic or a polymer. In some embodiments, the transparent lip further reflects and amplifies the light transmitted from the glow stick. In some embodiments, the transparent lip is a flat strip that is transparent, and is fixed to the head end of the body. In some embodiments, the transparent lip is fixed at a about a 45 degree angle from the body. In some embodiments, the transparent lip extends away from the body at a downward angle (e.g., 45 degree angle) as compared to the horizontal length of the body.

In some embodiments, a plurality of dark stripes 170 is disposed on the top portion 112 of the body 110. The plurality of dark stripes 170 may be displayed on the top portion of the body as a pattern of alternating black stripe and dark green section.

Further, a loop 180 for fishing line is disposed at the head end 116 of the body 110, and a hook 190 is disposed on the bottom portion 114 of the body 110. In some embodiments, the hook 190 is a treble hook. Further, more than one, for example, three hooks may be disposed at the bottom portion of the body.

In some embodiments, the body 110 is an elongated shape.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A luminescent fishing lure (100) for attachment to a fishing line and attracting fish, the lure (100) consisting of:
    (a) a body (110) having a top portion (112) and a bottom portion (114), the top portion (112) is opaque and the bottom portion (114) is transparent, the body further having a head end (116) and a tail end (118), wherein the head end (116) is on an extreme opposite end of the tail end (118);
    (b) a cavity (120) in the body for insertion of a glow stick (130), wherein the glow stick (130) radiates from the cavity (120) through the bottom portion (114) of the body (110);
    (c) an opening (140) on the body (110) that opens up the body to the cavity (120);
    (d) a cap (150) to seal off the opening (140) to the cavity (120) as to prevent any scent from the glow stick (130) from leaking to the outside of the cavity (120), the cap (150) is disposed on the tail end (118) of the body (110), wherein the cap is disposed on the tail end (118);
    (e) a transparent lip (160) disposed on the head end (116) of the body (110) to reflect and amplify the light transmitted from the glow stick (130), wherein the transparent lip (160) and the cap (150) are disposed on opposing ends of the lure (100) relative to each other;
    (f) a plurality of dark stripes (170) disposed on the top portion (112) of the body (110);
    (g) a loop (180) for fishing line disposed at the head end (116) of the body (110);
    (h) a hook (190) disposed on the cap (150), wherein the hook (190) and the transparent lip (160) are disposed on opposing ends of the lure (100) relative to each other; and
    (i) an eye (500) disposed on the head end of the lure, wherein the eye (500) and the hook (192) located on the cap are disposed on opposing ends of the lure (100) relative to each other.

* * * * *